US005577603A

United States Patent [19]

Bogdanovs et al.

[11] Patent Number: 5,577,603

[45] Date of Patent: Nov. 26, 1996

[54] REMOTE, SELF-ADJUSTING OPERATOR FOR AN ELECTRICAL ENCLOSURE

[75] Inventors: Andris Bogdanovs, Liverpool; Paul J. Bartlett, Camillus, both of N.Y.

[73] Assignee: Cooper Industries, Inc., Houston, Tex.

[21] Appl. No.: 326,885

[22] Filed: Oct. 21, 1994

[51] Int. Cl.[6] .................................................... H02B 1/46

[52] U.S. Cl. ......................... 200/331; 200/337; 200/332

[58] Field of Search .................................... 200/331, 330, 200/329, 332, 333, 334, 335, 336, 337, 338, 43.22

[56] References Cited

U.S. PATENT DOCUMENTS 5,286,935 2/1994 Mina et al. ............................ 200/331
5,288,958 2/1994 Grunert et al. ........................ 200/331
5,319,168 6/1994 Hutko et al. ........................... 200/331

FOREIGN PATENT DOCUMENTS 10493 7/1917 United Kingdom .................. 200/331

*Primary Examiner*—David J. Walczak
*Attorney, Agent, or Firm*—Burns, Doane, Swecker & Mathis LLP

[57] ABSTRACT

The remote, self adjusting operator for a circuit breaker according to the present invention allows a circuit breaker toggle to be operated from the exterior of the an explosion-proof enclosure over the circuit breaker panel. The operator includes a shaft having one end extending outside of an enclosure door and another end extending inside the enclosure door. A handle is attached to the shaft at the exterior of the door and an operating fork is attached to the shaft at the inside of the door. The operating fork having a slot for receiving the toggle is designed to prevent damage to the circuit breaker toggle or the operating fork if the door is close when the fork is not properly aligned with the toggle. A spring is provided on the shaft between the fork and the inside surface of the door which allows the fork to move axially on the shaft when it engages the toggle. A sloped surface on the bottom of the fork will cause the fork to move across the toggle until the slot is aligned over the toggle. In this way the circuit breaker toggle may be operated from the exterior of the enclosure door and careful alignment of the operator with the toggle while closing the door is unnecessary.

14 Claims, 2 Drawing Sheets

FIG. 1
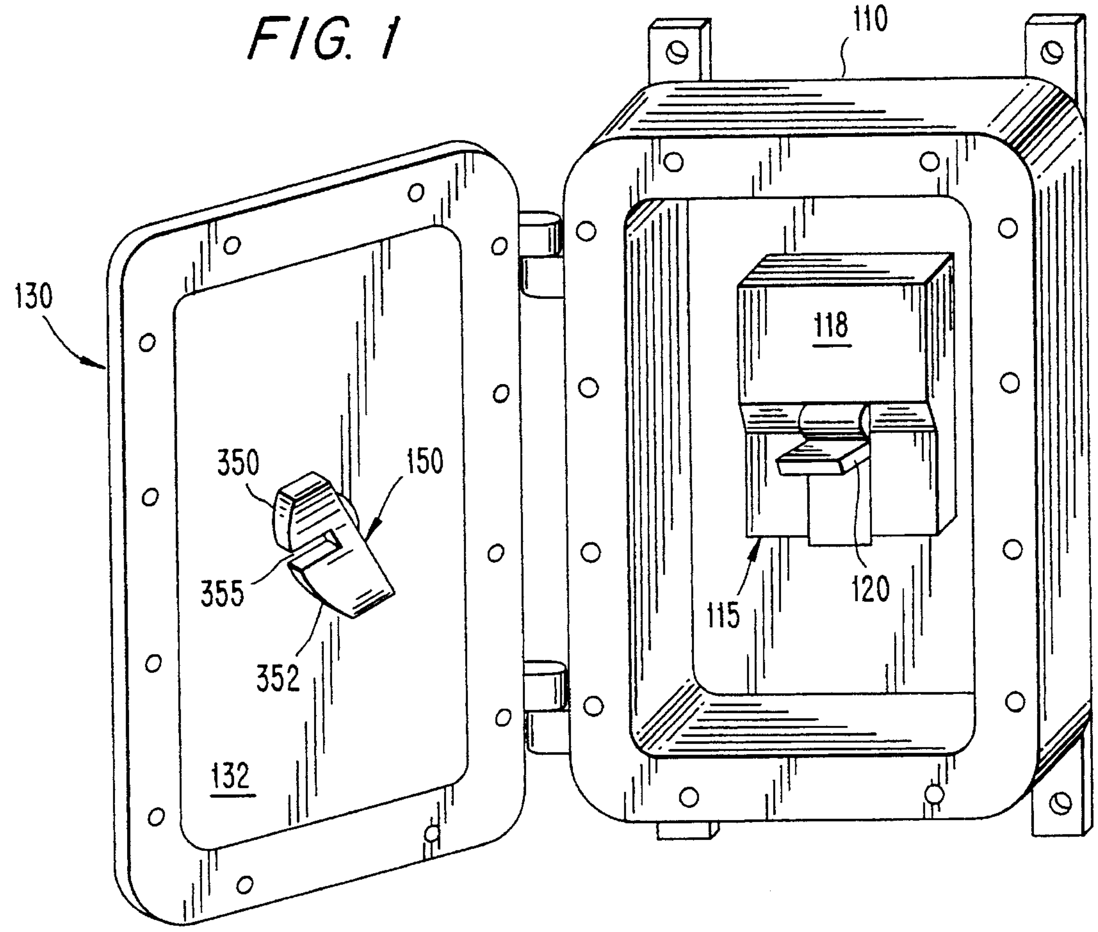
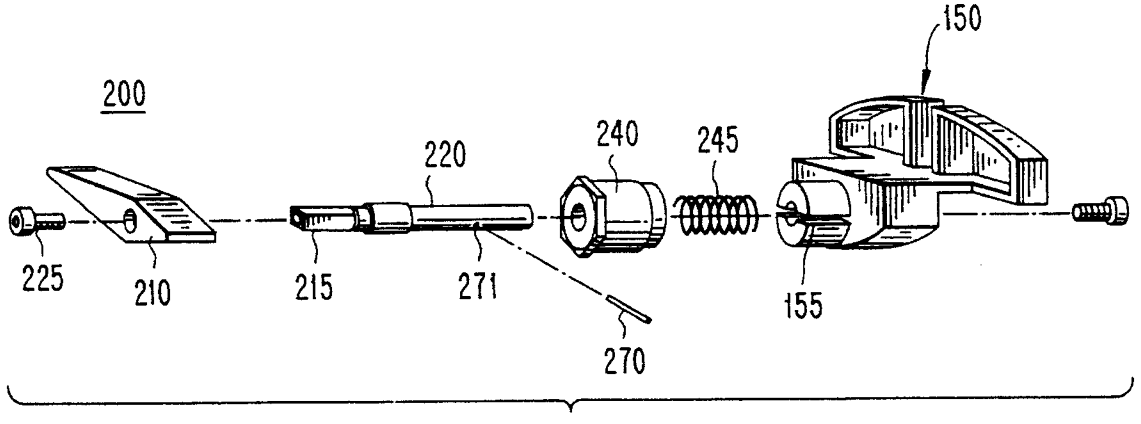
FIG. 2

REMOTE, SELF-ADJUSTING OPERATOR FOR AN ELECTRICAL ENCLOSURE

BACKGROUND OF INVENTION

The present invention relates to a remote operator for manipulating a toggle; more particularly, the present invention relates to a self-adjusting remote operator for the door of an electrical enclosure which will align itself over a circuit breaker toggle. In order to provide a circuit breaker panel useable in an environment containing flammable vapors, the arc producing circuit breakers must be enclosed within an explosion-proof enclosure. Explosion proof enclosures provide a measure of safety by creating a barrier between flaming gases and the personnel operating the circuit breakers. The enclosures can also provide the security function of denying direct access to the "ON-OFF" toggle located on the circuit breaker.

A remote operating device is typically used to penetrate the enclosure wall and engage the circuit breaker operator. Usually, the position of the circuit breaker requires this operator to be located in the door of the enclosure. Prior art remote operators have certain limitations. For example, during product assembly, installation and maintenance, the door must be opened and the remote operator disengaged with the circuit breaker in either the "ON" or "OFF" position. Reclosing the door with a misaligned operator can damage the operator and breaker or prevent the operator from engaging the breaker toggle, leaving the circuit breaker in operable.

Typically misalignment is remedied by painstakingly guiding the operator onto the toggle as the door closes. Additional adjustment is required to compensate for height variations of the circuit breaker and to position the operator in correct relation to the toggle. These tasks are performed blind, requiring the person making the adjustment to do so with the enclosure door closed, not seeing how the operator mates with the toggle.

There is a need therefore, for a self adjusting, remote operator for an enclosure that will align itself over a breaker toggle as the enclosure door is closed. There is a further need therefore, for a remote operator which will compensate for various distances between the enclosure door and the breaker.

SUMMARY OF INVENTION

The invention provides a door mounted, self adjusting operator for an electrical panel board to remotely switch a circuit breaker ON and OFF through the panel board enclosure. The operator includes a spring loaded fork portion whereby the fork slides along a shaft if it is not aligned over the toggle when the enclosure door is closed. The bottom surfaces of the fork include sloped surfaces that cause the fork to move rotationally along the breaker toggle automatically adjusting the slot in the fork over the breaker toggle. The spring loaded fork also compensates for breaker housings of various heights.

BRIEF DESCRIPTION OF THE FIGURES

FIG. 1 shows an enclosure having a breaker with a toggle and also showing the operator fork installed in the door of the enclosure;

FIG. 2 is an exploded view showing the remote operator that is the subject of the present invention;

DESCRIPTION OF AN EMBODIMENT

Figure 3:
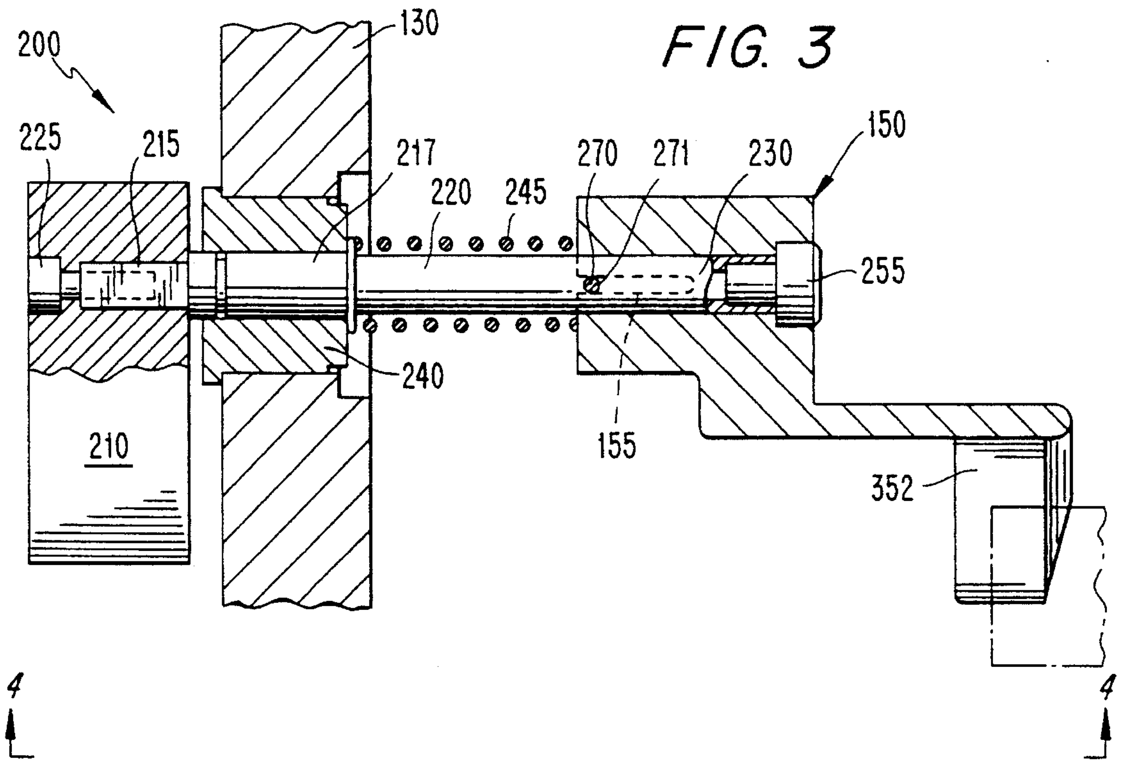
FIG. 3 is a view, partially in section, showing the remote operator.

The present invention can best be understood by reference to the figures. FIG. 1 shows an enclosure 110 which includes a breaker 115 having a toggle 120. Also shown extending from inside surface 132 of door 130 is fork 150 having a first 350 and second 352 foot with slot 355 formed between them. Fork 150 is designed to fit over toggle 120 when door 130 is closed. With door 130 closed and toggle 120 held in slot 355, fork 150 can be manipulated by a handle (not shown) on the outside of door 130. The fork 150 moves the toggle 120 turning the breaker 115 on or off while the door 130 is closed and the enclosure 110 is sealed from the environment.

FIG. 2 is an exploded view showing the entire fork assembly 200 of the preferred embodiment. Handle 210 is secured to a first end 215 of shaft 220 by screw 225. A second end 230 of shaft 220 extends through bearing 240 and spring 245 and terminates into fork 150 where it is retained by screw 255. Pin 270 extends through aperture 271 in shaft 220 and each end of the pin 270 extends into a split neck 155 formed in the top portion of fork 150. In the preferred embodiment, fork 150 is molded of cast aluminum.

FIG. 3 depicts the remote operator 200 installed in the enclosure door 130. The first end 215 of shaft 220 is retained in handle 210 by screw 225. Enlarged portion 217 of shaft 220 is retained within bearing 240 and bearing 240 is retained in the enclosure door 130. Spring 245 is held on shaft 220 between bearing 240 and split neck portion 155 of fork 150. Fork 150 is retained at the second end 230 of shaft 220 by screw 255. Pin 270 extends through aperture 271 in shaft 220 and each end of pin 270 slides within the split neck portion 155 of fork 150. The freedom of movement of pin 270 within split portion 155 allows fork 150 to move axially along shaft 220 and continue to transmit radial movement from handle 210 to fork 150.

Figure 4:
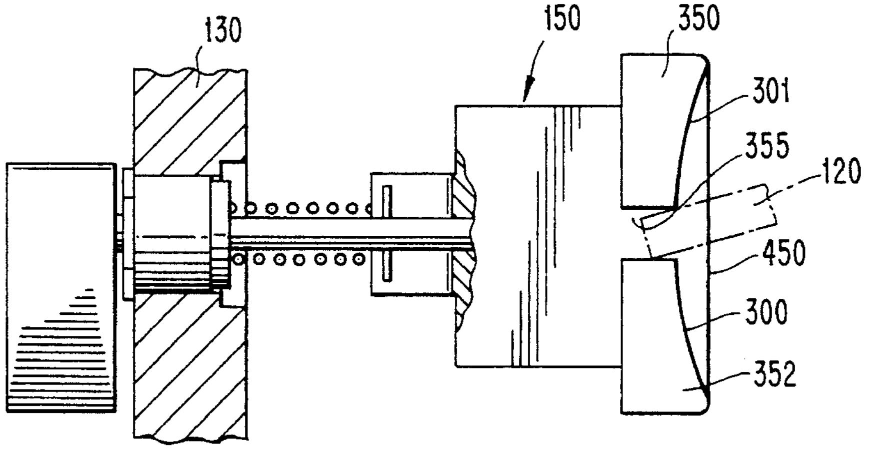
FIG. 4 is a view, partially in section, showing the remote operator riding atop a toggle.
Figure 5:
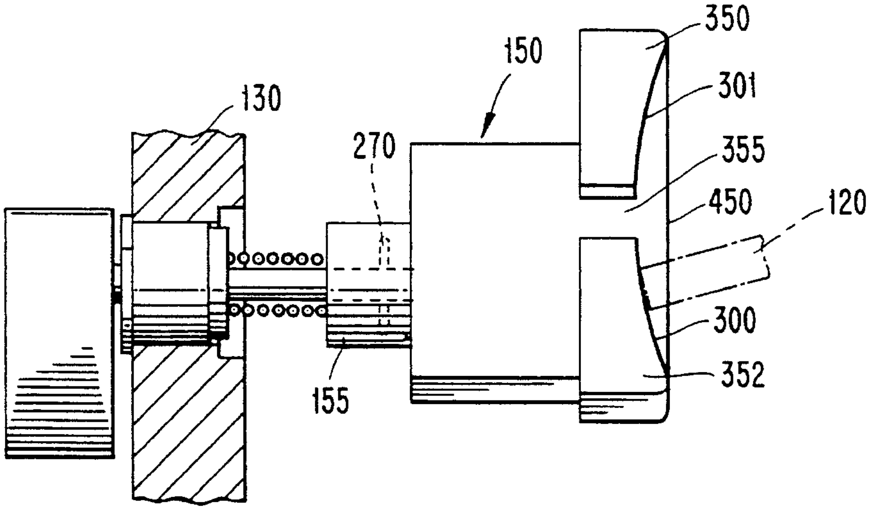
FIG. 5 is a view, partially in section, showing the remote operator when it is properly positioned over a toggle.

FIGS. 4 and 5 demonstrate the action of the remote operator in use. The operator is designed to self align fork 150 over toggle 120 as door 130 is closed, thus preventing damage to the toggle or the operator if door 130 is closed when the fork is not properly aligned. FIG. 5 depicts the situation in which the door of the enclosure has been closed when the slot 355 of fork 150 is not aligned over toggle 120. Toggle 120 has contacted the bottom surface 300 of foot 352 causing the fork 150 to be pushed away and compressing spring 245 between the fork 150 and bearing 240. The bottom surface 300 of foot 352, because it is slanted towards the slot 355, will act upon the top surface of toggle 120 and cause the fork to rotate in a counterclockwise direction until slot 335 is centered over the toggle 120. At that point, the fork will return to its extended position as shown in FIG. 4. In the event that the toggle contacts the opposite, slanted surface 301, the fork will rotate in a clockwise motion to center the slot 355 over the toggle 120.

In addition to correcting for misalignment between the fork 150 and the toggle 120, the operator assembly will also compensate for a breaker housing of irregular height. Fork 150 includes rear bottom surface 450 (FIG. 4) which is not slanted and therefore extends below the other surfaces 300 and 301. In the event that a breaker housing is used with a greater than average height (FIG. 1), bottom surface 450 will contact the top surface 118 of the breaker housing and cause the fork assembly to move along the shaft 220. In this manner, the operator will remain partially retracted in order to ensure the proper relation between the fork 150 and the toggle 120.

The remote operator of the present invention can also be used in groups of two or more to control a plurality of breaker switches. In a typical arrangement, the operators would be aligned whereby the forks 150 would nest behind one the next.

The present invention, because it provides a remote operator that is self adjusting and self adjusting, solves the problems associated with misaligned operators and damage resulting from these conditions. Additionally, the problem if breaker housings of varying heights can be accomplished without lengthy hand adjustments.

While the remote operator of the present invention has been described by reference to its preferred embodiment, it will be understood that other various embodiments of the device may be possible by reference to the specification and the appended claims. Such additional embodiments shall be included within the scope of the appended claims.

We claim:

1. A self adjusting, door mounted remote circuit breaker operator for an electrical enclosure, said operator comprising:

a shaft having a first end extending outside said enclosure door and a second end extending inside said enclosure door;

a handle attached to the first end of the shaft;

an operating fork attached to the second end of the shaft, said fork having means for manipulating a toggle switch;

means for transmitting rotational movement from the handle to the fork; and means for self adjustment of the fork over the toggle switch such that upon pivoting of the enclosure door from an open position to a closed position the fork automatically adjusts to receive the toggle switch.

2. The operator as described in claim 1, whereby said means for manipulating said toggle includes a first and second foot formed on said fork, said feet forming a slot between them, said slot having two side surfaces and a rear surface.

3. The operator as described in claim 2, wherein the means for self adjustment of said fork over said toggle switch includes a spring on the shaft between said fork and said inside surface of said door, said spring allowing axial movement of the fork along the shaft whereby, when said first or second foot of said fork contacts a surface of said circuit breaker, said fork will move axially towards said first end of said shaft and away from the second end of the shaft.

4. The operator as described in claim 3, wherein the means for self adjustment further includes a bottom surface formed on said first foot, said bottom surface sloped towards said slot whereby, upon contact with said toggle, said surface will cause said fork to move across said toggle, aligning said slot over said toggle.

5. The operator as described in claim 4, wherein the means for self adjustment further includes a bottom surface formed on said second foot, said bottom surface sloped towards said slot whereby, upon contact with said toggle, said surface will cause said fork to move across said toggle, aligning said slot over said toggle.

6. The operator as described in claim 5, wherein the means for transmitting rotational movement from the handle to the fork includes keying said fork to said shaft in a manner allowing axial movement of said fork along said shaft.

7. The operator as described in claim 5, wherein the means for transmitting rotational movement from the handle to the fork includes:

an aperture extending perpendicularly through said shaft;

a pin extending through said aperture; and a split neck formed in said fork, a first and second end of said pin extending into said split neck whereby, said pin transmits radial movement to said fork and said split neck allows axial movement of said fork along said shaft.

8. A self adjusting, door mounted remote circuit breaker operator for an electrical enclosure, said operator comprising:

a shaft having a first end extending outside said enclosure door and a second end extending inside said enclosure door;

a handle attached to the first end of the shaft;

an operating fork attached to the second end of the shaft, said fork having an opening for receiving and manipulating a toggle switch;

a transmission member for transmitting rotational movement from the handle to the fork; and a self adjustment mechanism for causing the opening in the fork to automatically adjust to receive the toggle switch upon pivoting of the enclosure door from an open position to a closed position.

9. The operator as described in claim 8, wherein the fork rotates coaxially with the shaft and the handle.

10. The operator as described in claim 8, wherein the fork slides axially on the shaft to maintain engagement of the fork with the toggle.

11. The operator as described in claim 1, wherein the fork rotates coaxially with the shaft and the handle.

12. The operator as described in claim 1, wherein the fork slides axially on the shaft to maintain engagement of the fork with the toggle.

13. The operator as described in claim 1, further comprising means for adjusting for variations in a distance between the enclosure door and the toggle.

14. The operator as described in claim 13, wherein the means for adjusting for variations is a spring.

* * * * *